United States Patent Office 3,189,923
Patented June 22, 1965

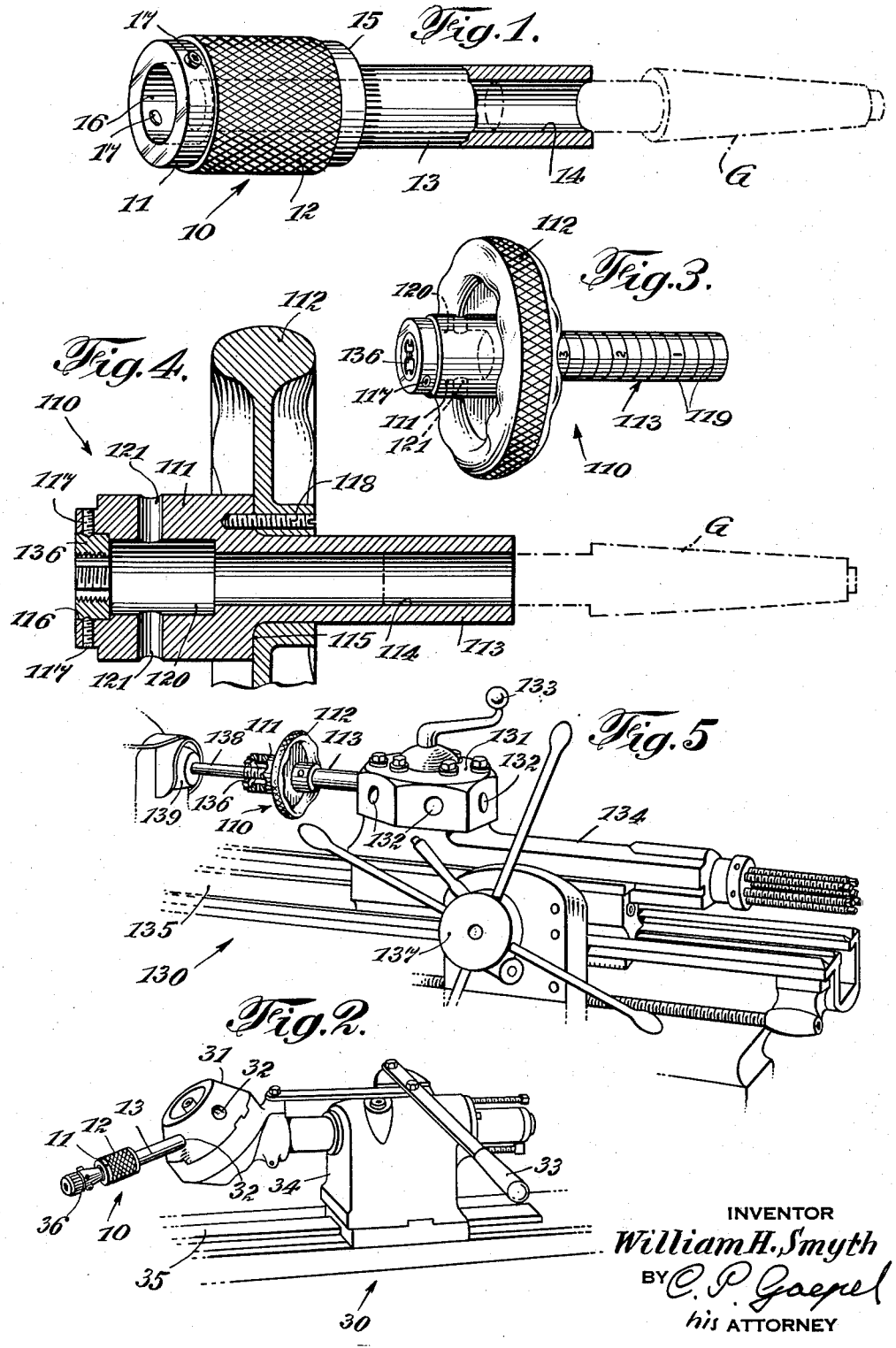

3,189,923
THREAD CUTTING TOOL HOLDER SUPPORTED BY TURRET TYPE LATHE
William H. Smyth, 44 W. 44th St., New York, N.Y.
Filed Oct. 8, 1962, Ser. No. 229,781
1 Claim. (Cl. 10—89)

This application is a continuation-in-part of my application Serial No. 728,203, now abandoned.

The present invention relates to thread cutting machines in general, and more particularly to holders for thread cutting tools which may be used in turret heads, drill presses, radial drills, engine lathes and other thread cutting machines. Still more particularly, the invention relates to a holder which constitutes an improvement over and a simplification of the device disclosed in U.S. Letters Patent No. 2,383,991 for "Die Holder and Tailstock Center," granted to Albert Sarossy on September 4, 1945.

The device disclosed in the Sarossy patent comprises a tap chuck or die holder and an adapter therefor, the latter being insertable directly into the tailstocks of engine or bench lathes. If such a device is to be used in turret lathes, an additional part in the form of a sleeve provided with a tapered bore must be inserted into the turret head opening to receive the adapter of the patented device.

An important object of the present invention is to provide a tap chuck or die holder for use in heads of lathes, drills and similar machines which may be operated without moving the head toward the work or vice versa.

Another object of the invention is to provide a manually operable one-piece tap chuck and die holder which is especially suited for use in connection with turret lathes.

A further object of the invention is to provide a holder of the above outlined characteristics which may be used in turret lathes of the type having heads provided with a number of cylindrical openings and which, merely by adding a suitable adapter, may be employed for carrying out similar work in bench or engine type lathes as well as in turret lathes whose heads are provided with tapered bores.

An additional object of the invention is to provide a tapping and threading tool for turret lathes which may be used with all standard types of dies and tap chucks, and which is capable of performing a tapping or thread cutting operation in a single pass.

Still another object of the invention is to provide a time saving tap chuck or die holder which may be used in turret lathes and in many other machines, which is comparatively inexpensive to make, and which reduces the danger of tap breakage.

A further object of the instant invention is to provide a manually operable one-piece holding device for thread cutting tools which may be used in drill presses or radial drills, especially for hand tapping in such machines.

With the above objects in view, the invention resides in the provision of an improved holder for thread cutting tools which is a one-piece implement including a tool holding portion and an extension or shank which latter is furnished in sizes enabling it to be inserted directly into a selected opening in the head of a turret lathe, of a drill press, of a radial drill or another machine tool. By coupling it with a suitable adapter, the holder of my invention may be used with equal advantage in bench or engine lathes as well as in turret lathes whose heads are formed with tapered openings.

The novel features which are considered as characteristic of the invention are set forth in particular in the appended claims. The invention itself, however, both as to its construction and its method of operation, together with additional objects and advantages thereof, will be best understood from the following detailed description of certain specific embodiments with reference to the accompanying drawings, in which:

FIG. 1 is a perspective view of a holder for a thread cutting tool with the shank of the holder partly broken away, the position of an adapter being indicated in phantom lines;

FIG. 2 is a fragmentary perspective view of a turret lathe, showing the holder of FIG. 1 inserted into an opening in the turret head;

FIG. 3 is a perspective view of a slightly modified holder which is provided with a hand wheel;

FIG. 4 is an axial section through the holder of FIG. 3, the position of an adapter being shown in phantom lines; and FIG. 5 is a fragmentary perspective view of a different turret lathe with the holder of FIG. 3 shown in actual use, the tool supporting portion of the holder being broken away.

Referring first to FIG. 1, the holder 10 comprises a cylindrical tool supporting portion 11 which is knurled, as at 12, to serve as a handgrip means, and an extension here shown as a guide sleeve or shank 13 which is provided with a coaxial bore 14. A shoulder 15 between the supporting portion 11 and the shank 13 determines the extent to which the holder may be inserted into the opening of a supporting means, such as the head of a lathe turret, of a drill press, of a radial drill, or of another machine tool. A recess 16 at the free axial end of the tool supporting portion 11 may receive a thread cutting tool, i.e., a tap chuck or a die (not shown), and such thread cutting tool is then detachably held in the recess 16 by screws 17. The diameter of the bore 14 is somewhat smaller than the diameter of the recess 16. It is not necessary that the bore 14 extend all the way to the recess 16; however, if the bore terminates short of this recess, the latter must be deep enough to accommodate at least a portion of a work piece when the holder is being put to actual use.

In FIG. 2, the shank 13 is shown inserted into one of several cylindrical openings 32 provided in a supporting means here shown as the rounded head 31 of a turret lathe 30. The head 31 may be rotated by means of a lever 33, and the entire turret 34 is movable longitudinally of the machine along the lathe bed 35. A thread cutting tool here shown as a tap chuck 36 is accommodated in the recess 16 of the shank 13. It is assumed in FIG. 2 that the diameters of all openings 32 in the head 31 are the same and that the outer diameter of the shank is selected in such a way that it allows for angular and axial displacements of the holder 10. The holder may be made of cold rolled steel which is preferably case hardened to insure long wear. As a rule, the holder is made in several sizes to take different types of thread cutting tools and to fit into differently dimensioned openings so that it may be utilized in cutting of any desired threads met with in normal turret lathe work. The periphery of the shank 13 is preferably finished to a high degree of smoothness.

FIGS. 3 and 4 illustrate a slightly modified holder 110 which is provided with a handgrip means in the form of a wheel 112 which abuts against a shoulder 115 extending between a tool supporting portion 111 for a thread cutting tool and a cylindrical shank 113. The wheel 112 is held in position by one or more screws or bolts 118. The periphery of the shank 113 is provided with a scale comprising annular scorings or graduations 119 which enable an operator to determine the length of threads to be cut or the length of thread which has been cut. The graduations 119 may be spaced as desired; for example, they may be one quarter of an inch apart.

A thread cutting tool here shown as a die 136 is received in a recess 116 provided at the front axial end of the tool supporting portion 111 and is held therein by set screws 117, preferably of the Allen type. A chip chamber 120 is provided between the recess 116 and the bore 114 of the shank 113, and this chamber communicates with radially extending chip disposal holes 121. Similar holes may be provided in the holder 10 of FIG. 1, if desired.

When the holder is to be used in engine or bench lathes, an adapter G, shown in phantom lines in FIG. 4, may be inserted into the bore 114 of the shank 113, whereupon the assembly including the holder 110 and the adapter G is put to use as described in the aforementioned patent.

Referring now to FIG. 5, there is illustrated a thread cutting machine in the form of a turret lathe 130 having a supporting means here shown as a hexagonal turret head 131 which is provided with openings 132 of constant cross section and which is rotatable with respect to a turret 134 by means of an actuating lever 133. The turret 134 may be moved in the longitudinal direction of the lathe bed 135 by means of a suitable mechanism 137. A work piece 138 is held in a retaining means here shown as a conventional rotary lathe chuck 139.

The shank 113 of the holder 110 is inserted into one of the openings 132 and, after having been moved to assume a position at a requisite distance from the work piece 138, the turret 134 is arrested by the mechanism 137. The chuck 139 is driven by the lathe motor (not shown) to rotate the work piece 138, whereupon the operator grasps the hand wheel 112 and moves the holder 110 toward the chuck by sliding the shank 113 in that opening 132 which is aligned with the work piece. With the thread cutting tool 136 installed and locked in the front recess 116 by means of screws 117, and with the shank 113 inserted into that opening 132 which is aligned with the chuck 139, the shank is moved axially by hand pressure so that the tool 136 engages the work piece 138 while the latter rotates with the chuck 139. Though the work piece 138 rotates, operator's hand or hands, acting as a clutch upon the hand wheel 112, prevent rotation of the holder 110 and hence of the cutting tool 136. The threading action resulting from such engagement entrains the holder 110 to the left, as viewed in FIG. 5, whereby the shank 113 gradually slides out of the selected opening 132. When the scale 119 indicates that a thread of desired length has been cut, the operator releases the hand wheel 112 to thereby immediately interrupt the thread cutting operation. The holder 110 and the cutting tool 136 then rotate or float freely with the work piece 138. In a following step, the motor of the lathe 130 is reversed to reverse the direction of rotation of the work piece 138, whereupon the operator again grips the hand wheel 112 to automatically unscrew the work piece from the cutting tool 136. During unscrewing, the shank 113 of the holder 110 is automatically pushed back into the opening 132.

When the thread is being cut, the turret 134 may be locked in position on the lathe bed 135. The turret 134 need not be moved toward the work piece 138 while cutting thread, nor is it necessary to move the turret away from the work piece when backing off from newly cut thread. The improved holder 110, being axially slidable in the selected turret head opening 132, is axially displaced upon slightest pull or push of the work and thus prevents stripping of the thread which would occur were the holder rigidly connected with the turret head. Even a negligible force will displace the tap chuck or the die holder with respect to the turret opening; i.e., there is no strain whatever on the thread. The work retaining means 139 may be revolved at top speed because the cutting tool, be it a tap or die, is locked in the improved holder and cannot be moved out of alignment with the work piece. Therefore, the threads may be cut faster and more effectively than heretofore, and the cost of the thread cutting operation is reduced accordingly.

An additional advantage of my improved holder is that it may be used for detachably connecting a thread cutting tool with a drill press or with a radial drill. Thus, when a hole has been drilled in a work piece held in a drill press or in a radial drill, the rear cylindrical portion of my tool holder is inserted into the vertical opening in the drill press or in the radial drill upon removal of the drill from such opening. This brings the thread cutting tool, which is fixed to the tool supporting portion 111 of the holder, into a position in which the thread cutting tool is coaxial with the bore formed in a work piece by the drilling tool and insures that a true right-angle thread is cut. If desired, spokes may be inserted into the tool supporting portion 111 to give greater leverage and to assist the operator in turning the tool by hand during the thread cutting operation.

Heretofore, when a work piece was being tapped or threaded in a turret lathe, it was necessary to move the entire turret toward or away from the work, either directly or indirectly by means of a suitable accessory. Since the weight of a turret or of such an accessory is considerable, it is practically impossible to cut fine-pitch or small-diameter threads on a work piece held in a turret lathe, especially in a large turret lathe, if the tool and the turret must move with respect to the work piece. Heretofore, this necessitated the transfer of each work piece to another machine tool and a secondary set-up in the latter in order to cut a thread of desired pitch and diameter. My improved holder has no rigid connection with the turret since the shank of the holder rotates and slides freely in the turret head opening. Thus, the weight of the turret head has no bearing on the thread cutting operation, and the axial forces upon the work are negligible whereby exceptionally fine threads may be cut irrespective of the weight of the turret head. Such delicate work may be carried out without necessitating transfer of the work piece to another machine and a secondary set-up in the latter.

The operation of the holding device 10 is analogous save that the operator's hands grip the knurled handgrip means 12. This type of holder is preferred when relatively small threads are cut.

It will be noted that the holder 10 or 110 moves axially in the turret head opening through a distance equal to the length of thread to be cut, whereby a fast, delicate and true action results. Very fine work can be done with my holder not only in turret lathes but also in drill presses, radial drills and in all other machines which can be used for cutting of threads, i.e., in which a rotary work retaining means is spaced from a turret or a similar supporting means adapted to accommodate the shank of my holder. The feature that the holder is angularly and axially displaceable in the turret head or in the drill opening eliminates any possibility of stripping or marring the threads during cutting or removal. This sliding action of the shank in the turret head or in the drill opening guides the shank in the turret head or in the drill opening guides the holder and trues the threads.

While the improved holder is especially suited for use in cutting of small threads, it may be used in cutting of larger threads and, by employing an adapter of the type shown in FIGS. 1 and 4, the holder may be used in ordinary engine and bench lathes.

The holder of my invention may be utilized with great advantage in all types of machine shops because it may be manufactured to fit into existing turret lathes or drilling apparatus. It may replace screw machines in all such establishments in which the screw machines might be idle a large part of the time, and the holder allows for fuller utilization of turret lathes, drill presses or radial drills. Furthermore, the holder may be installed and adjusted within exceptionally short periods of time, e.g., within about fifteen seconds, which is considerably faster than the time necessary in connection with conventional holders.

It is likewise within the purview of my invention to manufacture the improved holder of plastic material, for example, of metal-hard epoxies or the like.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claim.

What is claimed as new and desired to be secured by Letters Patent is:

In a turret lathe, in combination, a rotary chuck; a turret comprising a head spaced from said chuck and having at least one opening of constant cross section which is alignable with a workpiece mounted in said chunk; and a one-piece holder comprising a shank slidably received in said opening and a tool supporting portion rigid with and movable by said shank with respect to said head toward and away from said chuck so that a thread cutting tool installed in said tool supporting portion may be moved into thread cutting engagement with a workpiece mounted in said retaining means in response to direct manual displacement of said holder without necessitating movement of said head toward said chuck or vice versa, the head of said turret having a portion surrounding said opening and constituting the sole means for supporting and guiding the holder in its movements toward and away from said chuck and said holder being arranged to be held by hand when the thread cutting tool engages a workpiece to prevent rotation of the holder.

References Cited by the Examiner
UNITED STATES PATENTS

| | | | |
|---|---|---|---|
| 499,377 | 6/93 | Emig | 10—89 |
| 835,111 | 11/06 | Nicholson | 10—129 |
| 2,383,991 | 9/45 | Sarossy. | |
| 2,855,613 | 10/58 | Kostaka | 10—123 |

OTHER REFERENCES

"Threading and Tapping at High Speeds," page 120 of Tool and Die Journal, October 1946 issue.

ANDREW R. JUHASZ, *Primary Examiner.*
WILLIAM W. DYER, Jr., Examiner.